United States Patent [19]

Tobey, Jr. et al.

[11] 3,952,205

[45] Apr. 20, 1976

[54] LINEAR PHOTON COUPLED ISOLATOR

[75] Inventors: Morley C. Tobey, Jr., Sunnyvale; David F. Colicchio, La Honda, both of Calif.

[73] Assignee: Hewlett-Packard Company, Palo Alto, Calif.

[22] Filed: Nov. 25, 1974

[21] Appl. No.: 526,872

[52] U.S. Cl. ............................ 250/551; 250/214 L; 250/552; 307/311
[51] Int. Cl.² ...................... H04B 9/00; H03K 19/14
[58] Field of Search ............. 250/206, 211 J, 214 R, 250/551, 552; 307/311

[56] References Cited
UNITED STATES PATENTS

| | | |
|---|---|---|
| 3,125,693 | 3/1964 | De Clue ...................... 250/214 R X |
| 3,770,968 | 11/1973 | Hession ........................ 250/211 J X |
| 3,772,514 | 11/1973 | Sunderland ........................ 250/551 |
| 3,786,264 | 1/1974 | Ferro et al. ...................... 250/214 R |
| 3,818,235 | 6/1974 | Johnson et al. ...................... 250/551 |

OTHER PUBLICATIONS

E. G. & G. Technical Data Sheet, HA–100, HA–D–130, Printed 2/1968, 2 pp.

*Primary Examiner*—Alfred E. Smith
*Assistant Examiner*—E. R. LaRoche
*Attorney, Agent, or Firm*—Theodore S. Park

[57] ABSTRACT

A light emitting diode is driven by an input signal and electromagnetically coupled to a photodiode. The photodiode is connected to a high impedance load across which is obtained a signal linearly related to but electrically isolated from the input signal.

9 Claims, 3 Drawing Figures

LINEAR PHOTON COUPLED ISOLATOR

BACKGROUND OF THE INVENTION

A light emitting diode driven by an input signal and optically coupled to a photodiode to provide an output signal across the photodiode in response to the input signal is known in the art. The output signal produced by such prior devices is not a linear function of the input signal applied to the light emitting diode.

SUMMARY OF THE INVENTION

A photodiode is operated into a high impedance load to utilize the photodiode's resulting logarithmic open circuit voltage versus short circuit photocurrent characteristic. The photodiode is electromagnetically coupled to a photon emitting means having an exponential current versus voltage characteristic to produce an output signal from the photodiode which is a substantially linear function of an input signal applied to the photon emitting means.

DESCRIPTION OF THE PREFERRED EMBODIMENT

Figure 1:
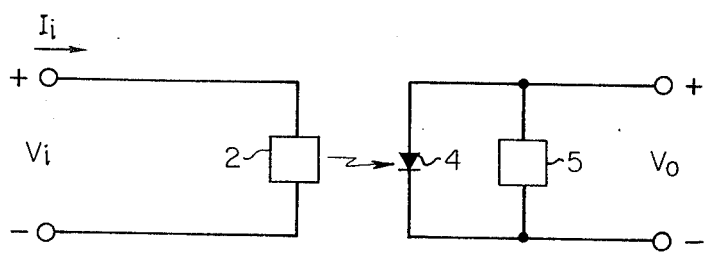
FIG. 1 is a diagram of a photon coupled isolator made in accordance with the invention.

Referring to FIG. 1, there is shown a photon emitting means 2 which may be, for example, a light emitting diode or the like, hereafter referred to as an LED, electromagnetically coupled to a photodiode 4 driving a high impedance load 5. LED 2 is driven by an input voltage $V_i$ producing a current $I_i$ therethrough.

The input current of LED 2 is generally represented as $$I_i = I_o [e^{qV_i/nkT} - 1]$$

where $I_o$ is its reverse leakage current, $q$ is the magnitude of the the charge of an electron, $n$ is a number whose value is dependent upon the particular mechanism responsible for current flow through LED 2, $k$ is Boltzmann's constant and $T$ is the absolute temperature. Over a selected range of $I_i$, $n$ is essentially constant. The values of these constants are well known or readily obtainable by one skilled in the art.

Analysis of the Thevenin equivalent circuit of an excited photodiode having open circuit voltage $V_{oc}$, output impedance $R_D$ and coupled to a load of impedance $R_L$ shows the voltage $V_o$ across the load of impedance $R_L$ to be $$\frac{V_{oc}}{1 + R_D/R_L}$$

where $$V_{oc} = \frac{nkT}{q} \ln \left[1 + \frac{I_s}{I_o^*}\right]$$

and $$R_D = \frac{nkT}{qI_s} \ln \left[1 + \frac{I_s}{I_o^*}\right]$$

where $I_o^*$ is the dark reverse leakage current of the photodiode 4, $n^*$ is a number, less than or equal to 2, whose value is dependent upon the particular mechanism responsible for current flow through the photodiode and $I_s$ is the short circuit photocurrent. For $$R_L > R_D, V_o \approx V_{oc} = \frac{nkT}{q} \ln \left[1 + \frac{I_s}{I_o^*}\right]$$

thereby producing a substantially logarithmic relation. For $R_L < R_D$, $V_o \approx I_s R_L$ thereby producing a substantially linear relation.

In the preferred embodiment the photodiode 4 is operated into the high impedance load 5, high being $$> \frac{2kT}{qI_s} \ln \left[1 + \frac{I_s}{I_o^*}\right].$$

The output flux of LED 2 in general varies as a power $m$ of input current $I_i$.

$$\phi_{LED} = C_1 I_i^m$$

$I_s$ is proportional to the input flux $$I_s = C_2 \phi_{LED} + I_o^*$$

$C_1$ and $C_2$ being constants. Combining the above and assuming $I_s < I_o^*$ yields >>

$$V_o = \frac{nkT}{q} \ln \left\{ \frac{1 + C_1 C_2 I_o^m [e^{qV_i/nkT} - 1]^m}{I_o^*} \right\}$$

In the preferred embodiment of FIG. 1, $n$ and $n$ are substantially constant, $V_i$ is greater than the quantity $nkT/q$ and $I_s$ is greater than $I_o^*$ thereby producing a substantially linear relationship which is expressed by $$V_o = \frac{nm}{n} V_i + \frac{nkT}{q} \ln \left[\frac{C_1 C_2 I_o^m}{I_o^*}\right]$$

Figure 2:
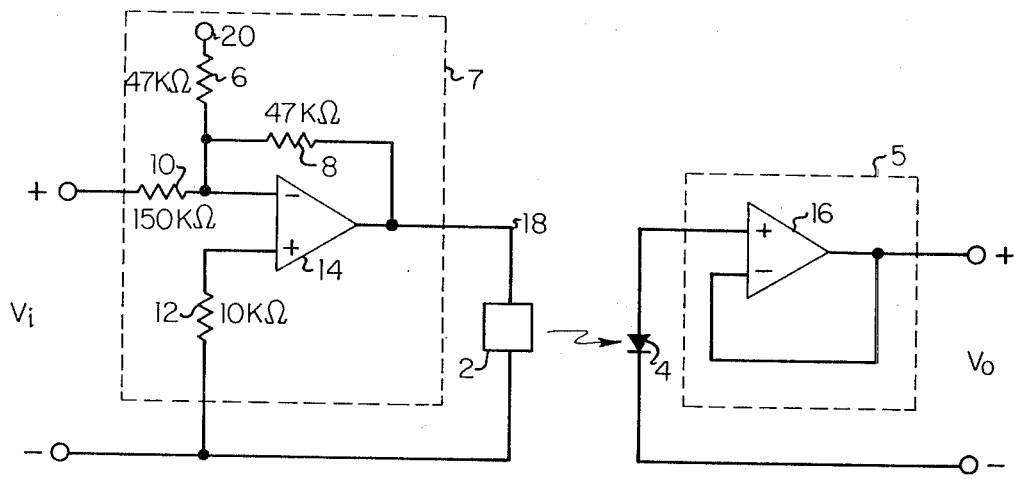
FIG. 2 is a diagram of another embodiment of a photon coupled isolator made in accordance with the invention.

Referring to FIG. 2, a second preferred embodiment of a photon coupled isolator is shown wherein an input voltage $V_i$ varies positively and negatively about a zero voltage reference. The output voltage $V_o$ is a substantially linear function of $V_i$. A voltage 18 at the output of a biasing means 7 is equal to $$- \left[\frac{V_{20}}{R_6} + \frac{V_i}{R_{10}}\right] R_8$$

where $V_{20}$ is the voltage applied at point 20, $R_6$ is the resistance of resistor 6, $R_8$ is the resistance of resistor 8 and $R_{10}$ is the resistance of resistor 10.

In the preferred embodiment of FIG. 2, $V_{20}$ is selected to provide the maximum symmetrical swing in a linear region of the system's transfer characteristic, and the high impedance load 5 is an amplifier 16.

The embodiment shown in FIG. 2 exhibits a gain of approximately 3 and a bandwidth of approximately 1 KHz for a range of $V_i$ or $\pm$ 180 mV. Amplifier 14 may be, for example, a National type LM307, or the like, and amplifier 16 may be, for example, a National type LH0022CD, or the like. Voltage 20 is approximately −1.3 volts. The resistor 12 supplies input bias current to the positive terminal of amplifier 14.

Figure 3:
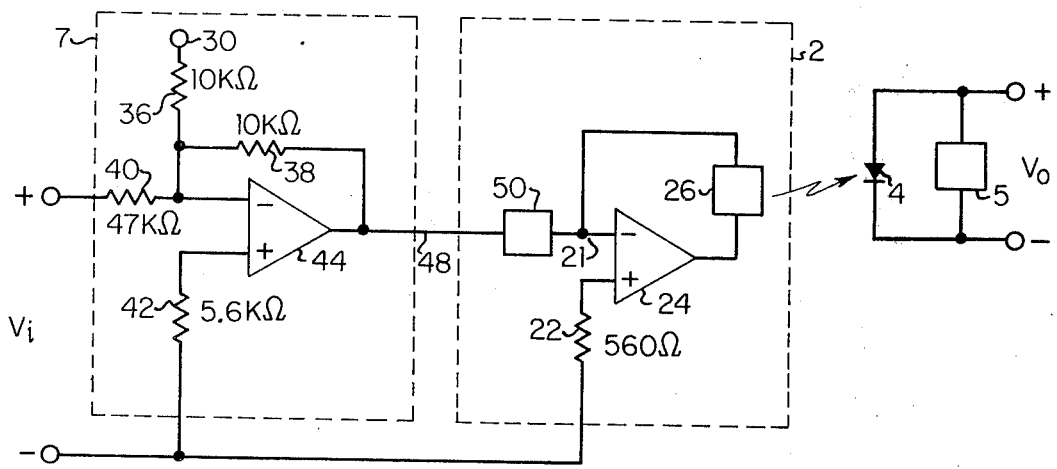
FIG. 3 is a diagram of an additional embodiment of a photon coupled isolator made in accordance with the invention.

Referring to FIG. 3, a third preferred embodiment of a photon coupled isolator is shown. The input voltage $V_i$ varies positively and negatively about a zero voltage reference. The output voltage $V_o$ is a substantially linear function of $V_i$. A voltage 48 at the output of bias means 7 is $$- \left[ \frac{V_{30}}{R_{36}} + \frac{V_i}{R_{40}} \right] R_{38}$$

where $V_{30}$ is the voltage applied at point 30, $R_{36}$ is the resistance of resistor 36, $R_{38}$ is the resistance of resistor 38 and $R_{40}$ is the resistance of resistor 40. Voltage 48 is applied to photon emitting means 2.

Photon emitting means 2 in FIG. 3 comprises an exponential means 50 coupled to receive the output of bias means 7 and to an input of an amplifier 24. Exponential means 50 has a current-voltage characteristic wherein its current is exponentially related to the voltage appearing across its terminals. In the preferred embodiment the exponential means 50 is for example a transistor type 2N3053 having its base and collector connected together and to point 48 and its emitter connected to point 21, a solid-state diode or the like. The current which flows through the exponential means 50 also flows through photon emission means 26 having photon emission proportional to the magnitude of its current raised to a power. In the preferred embodiment a second photon emitting means 26 is a light-emitting diode or any photon emitting means having photon emission proportional to the magnitude of a signal applied thereto raised to a power.

The embodiment shown in FIG. 3 exhibits a gain of approximately 0.5 and a bandwidth of approximately 2 KHz for a range of $V_i$ of ± 150 mV. Amplifiers 44 and 24 may be, for example, National type LM307, or the like. Voltage V30 is approximately −0.6 volts. Resistor 22 supplies input bias current to the positive terminal of amplifier 24, and resistor 42 supplies input bias current to the positive terminal of amplifier 44.

We claim:
1. A photon coupled isolator comprising:
photon emitting means coupled to receive an applied input signal $I_i$ and having photon emission exponentially related to the applied input signal for producing radiation; and
a photodiode having a logarithmic voltage versus photocurrent characteristic coupled to receive radiation from the photon emission means and connected to a high impedance load for producing an output signal across the high impedance load which is a substantially linear function of said applied input signal,
said high impedance load having an impedance greater than

$$\text{than} \quad \frac{2kT}{qI_s} \ln\left[1 + \frac{I_s}{I_o{}^*}\right].$$

$k$ being Boltzmann's constant, $T$ being the absolute temperature, $q$ being the magnitude of the charge of an electron, $I_s$ being the value of short circuit photocurrent produced by the photodiode in response to receiving radiation corresponding to the applied signal $I_i$ from the photon emitting means, and $I_o{}^*$ being the photodiode dark reverse leakage current.

2. A photon coupled isolator as in claim 1 including:
biasing means coupled to the photon emitting means for adjusting the quiescent operating point of the photon emitting means.

3. A photon coupled isolator as in claim 1 including:
an amplifier connected to receive an input voltage for producing the input signal in response to the input voltage.

4. A photon coupled isolator as in claim 1 wherein the high impedance load comprises the input of an amplifier.

5. A photon coupled isolator as in claim 1 wherein the photon emitting means includes a light emitting diode.

6. A photon coupled isolator as in claim 1 wherein photon emitting means comprise:
exponential means having an exponential voltage-current characteristic;
light emitting means having photon emission proportional to the magnitude of a signal applied thereto raised to a power; and
means for coupling the exponential means with the applied input signal and the light emitting means.

7. A photon coupled isolator as in claim 6 wherein the light emitting means is a light emitting diode.

8. A photon coupled isolator as in claim 6 wherein the exponential means is a solid-state diode.

9. A photon coupled isolator as in claim 6 wherein the exponential means is a transistor connected as a diode.

\* \* \* \* \*

UNITED STATES PATENT AND TRADEMARK OFFICE
CERTIFICATE OF CORRECTION

PATENT NO. : 3,952,205
DATED : April 20, 1976
INVENTOR(S) : Morley C. Tobey, Jr. and David F. Colicchio It is certified that error appears in the above-identified patent and that said Letters Patent are hereby corrected as shown below:

Column 1, at approximately line 45, that portion of the equation reading " $e^{qvi}$ " should read -- $e^{qV_i}$ --; at approximately line 68, that portion of the equation reading " $\frac{nkT}{q}$ " should read -- $\frac{n*kT}{q}$ --;

Column 2, immediately following line 1, that portion of the equation reading " $\frac{nkT}{qI_s}$ " should read -- $\frac{n*kT}{qI_s}$ --; line 11, immediately after "For" insert -- $R_L > R_D$, --; in the equation between lines 11 and 16, " $R_L > R_D$, " should be deleted, and that portion of the equation reading " $\frac{nkT}{q}$ " should read -- $\frac{n*kT}{q}$ --; line 33, "$I_s < I_o^*$ yields >>" should read -- $I_s \gg I_o^*$ yields --; line 35, that portion of the equation reading " $\frac{nkT}{q}$ " should read -- $\frac{n*kT}{q}$ --; line 38, "n and n" should read -- n and n* --; line 45, that portion of the equation reading " $\frac{nm}{n}$ " should read -- $\frac{n*m}{n}$ --; line 45, that portion of the equation reading " $\frac{nkT}{q}$ " should read -- $\frac{n*kT}{q}$ --; line 67, "$V_i$ or $\pm$ 180 mV." should read -- $V_i$ of $\pm$ 180 mV. --;

UNITED STATES PATENT AND TRADEMARK OFFICE
CERTIFICATE OF CORRECTION

PATENT NO. : 3,952,205
DATED : April 20, 1976
INVENTOR(S) : Morley C. Tobey, Jr. and David F. Colicchio It is certified that error appears in the above–identified patent and that said Letters Patent are hereby corrected as shown below:

Column 4, between lines 9 and 14, delete "than" immediately preceding the equation.

Signed and Sealed this

Twenty-sixth Day of October 1976

[SEAL]

Attest:

RUTH C. MASON
*Attesting Officer*

C. MARSHALL DANN
*Commissioner of Patents and Trademarks*